United States Patent
Chen et al.

(10) Patent No.: US 11,928,289 B2
(45) Date of Patent: Mar. 12, 2024

(54) TOUCH SENSING METHOD FOR NON-WATER MODE AND WATER MODE

(71) Applicant: NOVATEK Microelectronics Corp., Hsinchu (TW)

(72) Inventors: Yu-Huang Chen, Tainan (TW); Ting-Yu Chan, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/813,041

(22) Filed: Jul. 17, 2022

(65) Prior Publication Data
US 2024/0019965 A1 Jan. 18, 2024

(51) Int. Cl.
*G06F 3/041* (2006.01)

(52) U.S. Cl.
CPC ...... *G06F 3/04186* (2019.05); *G06F 3/04166* (2019.05)

(58) Field of Classification Search
CPC .......... G06F 3/04186; G06F 3/04166; G06F 3/041662; G06F 3/0418; G06F 3/044; G06F 3/0446; G06F 2203/04104; G06F 3/041661; G06F 3/04182; G06F 3/0447; A61K 2035/115; B09C 1/062; B09C 1/085; C05B 1/04; C12N 9/2417; C05F 17/00; C12Y 302/01001; G06T 2207/20081; G06T 2207/30242; G06T 7/0002; G06T 7/68; H01R 11/01; H01R 11/05; H03K 19/0013
See application file for complete search history.

(56) References Cited

U.S. PATENT DOCUMENTS

| | | | |
|---|---|---|---|
| 10,824,270 B1 * | 11/2020 | Wang | G06F 3/0418 |
| 2013/0176268 A1 * | 7/2013 | Li | G06F 3/04186 |
| | | | 345/174 |
| 2019/0042016 A1 * | 2/2019 | Wang | G06F 3/0443 |
| 2019/0056823 A1 * | 2/2019 | Stevenson | G06F 3/0443 |
| 2019/0332223 A1 * | 10/2019 | Hao | H10K 59/40 |
| 2020/0341585 A1 | 10/2020 | Li et al. | |
| 2020/0371661 A1 * | 11/2020 | Hung | G06F 3/04166 |
| 2021/0149520 A1 * | 5/2021 | Zhu | G06F 3/04883 |

FOREIGN PATENT DOCUMENTS

| | | |
|---|---|---|
| TW | 201907276 A | 2/2019 |
| TW | 201910988 A | 3/2019 |
| TW | 202043998 A | 12/2020 |

* cited by examiner

*Primary Examiner* — Chun-Nan Lin
(74) *Attorney, Agent, or Firm* — CKC & Partners Co., LLC

(57) ABSTRACT

A touch sensing method for a touch panel includes following operations: entering a first touch sensing process and performing a non-water mode; determining whether there is water on the touch panel in the first touch sensing process; entering a second touch sensing process and performing a water mode when there is water detected on the touch panel in the first touch sensing process; determining whether there is water on the touch panel in the second touch sensing process; and entering the first touch sensing process and performing the non-water mode when there is no water detected on the touch panel in the second touch sensing process.

13 Claims, 15 Drawing Sheets

TOUCH SENSING METHOD FOR NON-WATER MODE AND WATER MODE

BACKGROUND

Technical Field

The present disclosure relates to touching technology. More particularly, the present disclosure relates to a touch sensing method.

Description of Related Art

With developments of technology, touch panels are applied to various electronic devices. A user can touch the touch panel of one electronic device, and the processor in the electronic device can determine a touch position and perform corresponding functions. However, when there is water on the touch panel, the mutual-capacitance is changed, resulting in wrong judgment.

SUMMARY

Some aspects of the present disclosure are to a touch sensing method for a touch panel. The touch sensing method includes following operations: entering a first touch sensing process and performing a non-water mode; determining whether there is water on the touch panel in the first touch sensing process; entering a second touch sensing process and performing a water mode when there is water detected on the touch panel in the first touch sensing process; determining whether there is water on the touch panel in the second touch sensing process; and entering the first touch sensing process and performing the non-water mode when there is no water detected on the touch panel in the second touch sensing process.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
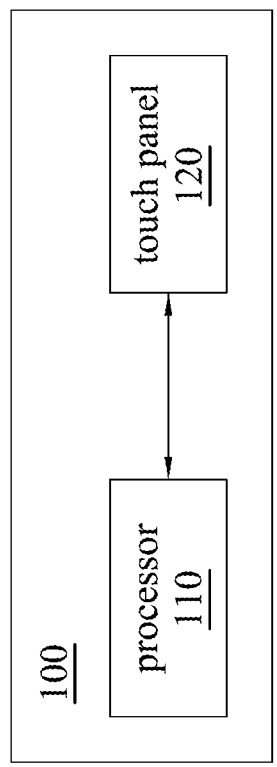
FIG. 1 is a schematic diagram illustrating a touch device according to some embodiments of the present disclosure.

Reference is made to FIG. 1. FIG. 1 is a schematic diagram illustrating a touch device 100 according to some embodiments of the present disclosure. As illustrated in FIG. 1, the touch device 100 includes a processor 110 and a touch panel 120. The processor 110 is coupled to the touch panel 120 and controls the touch panel 120. In some embodiments, the touch panel 120 is a touch and OLED display panel.

Figure 2:
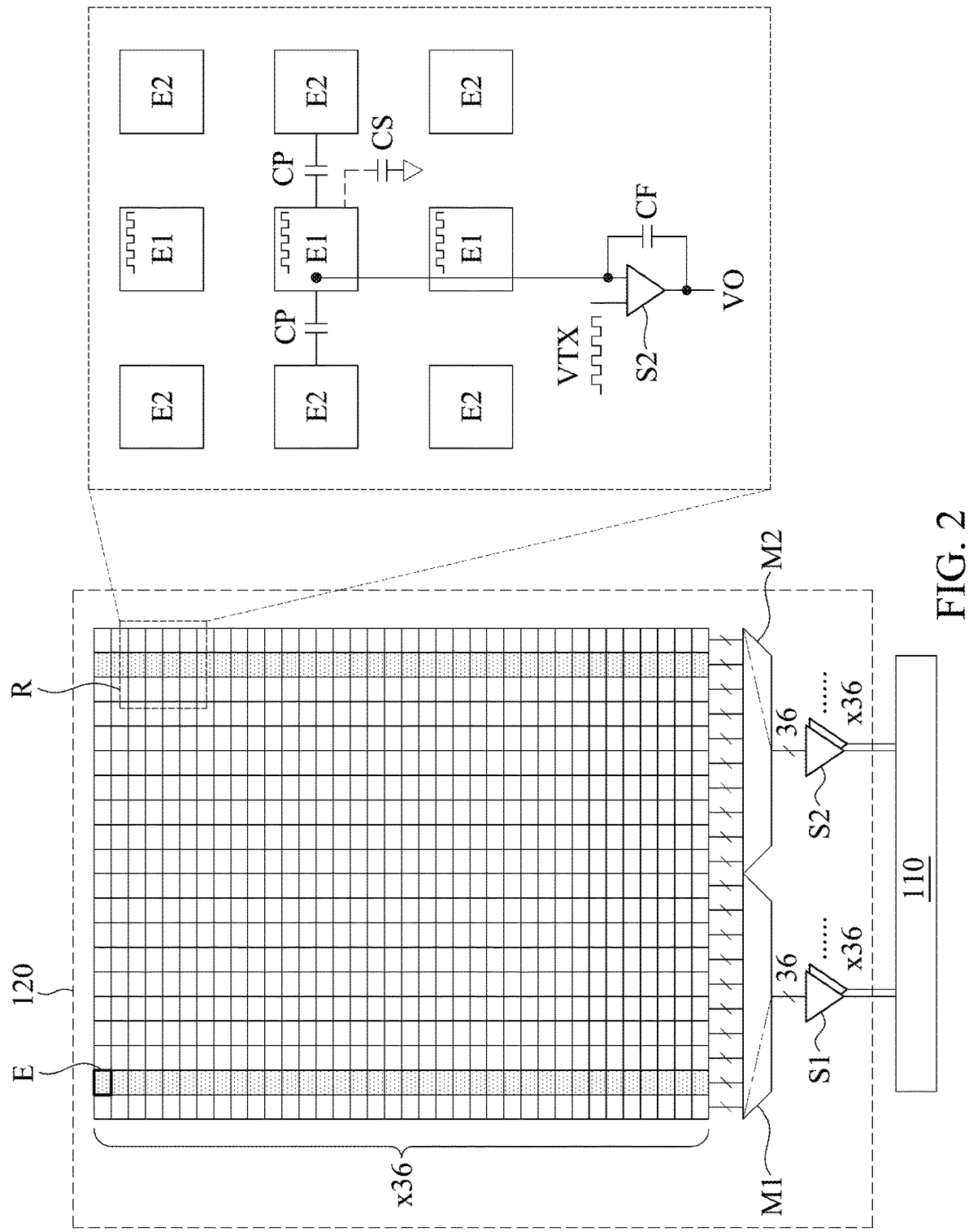
FIG. 2 is a schematic diagram illustrating the touch device in FIG. 1 according to some embodiments of the present disclosure.

Reference is made to FIG. 2. FIG. 2 is schematic diagram illustrating the touch device 100 in FIG. 1 according to some embodiments of the present disclosure.

As illustrated in FIG. 2, the touch panel 120 includes a plurality of sensing electrodes E. In this example, the sensing electrodes E in the touch panel 120 are arranged by 20 columns and 36 rows. In other words, there are 720 sensing electrodes E in the touch panel 120. However, the present disclosure is not limited to the configurations in FIG. 2. In this example, the touch panel 120 further includes multiplexers M1-M2, a plurality of sensing circuits S1, and a plurality of sensing circuits S2. The sensing circuits S1 are coupled to the multiplexer M1, and the sensing circuits S2 are coupled to the multiplexer M2.

Taking a region R as an example, there are 9 sensing electrodes E, in which 3 sensing electrodes E1 receive driving signals VTX, and 6 sensing electrodes E2 are coupled to a ground. To be more specific, the sensing circuit S2 includes a positive input terminal, a negative input terminal, and an output terminal. The positive input terminal of the sensing circuit S2 receives the driving signal VTX, and the negative input terminal of the sensing circuit S2 couples the driving signal VTX to a corresponding sensing electrode E1 (shown in the center) by a negative feedback loop mechanism. The output terminal of the sensing circuit S2 can output a sensing signal VO of the corresponding sensing electrode E1. Other sensing electrodes E1 have similar operations.

With this configuration, for the corresponding sensing electrode E1 (shown in the center) coupled to the sensing circuit S2, a capacitor CS (self-capacitance) is formed between the sensing electrode E1 and the ground, and two capacitors CP (mutual-capacitance) are formed between the sensing electrode E1 and adjacent sensing electrodes E2 when the voltage of the sensing electrode E1 is different from voltages of the sensing electrodes E2. A finger can affect the capacitor CS but does not affect the capacitor CP. On the contrary, water can affect the capacitor CP but does not affect the capacitor CS. In addition, a capacitor CF is formed between the output terminal of the sensing circuit S2 and the negative input terminal of the sensing circuit S2.

Figure 3:
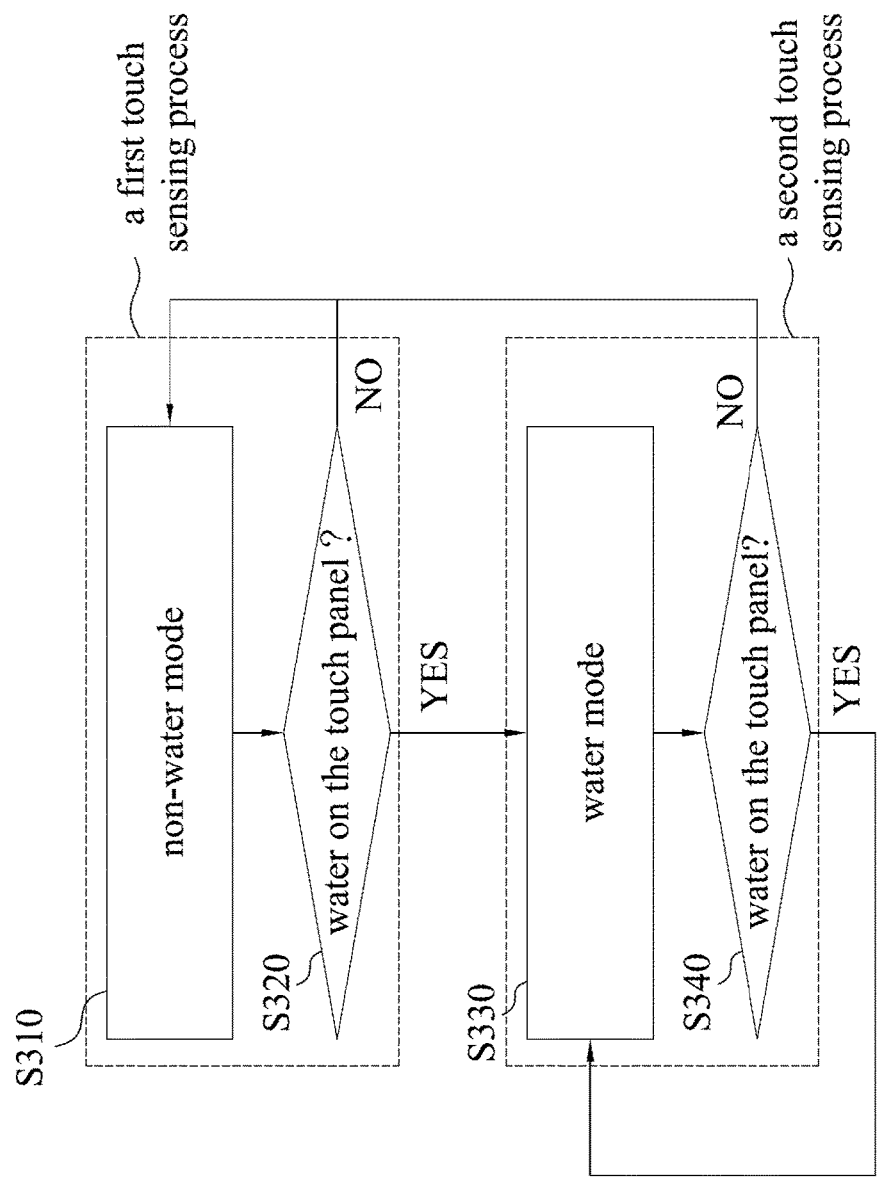
FIG. 3 is a flow diagram illustrating a touch sensing method according to some embodiments of the present disclosure.

Reference is made to FIG. 3. FIG. 3 is a flow diagram illustrating a touch sensing method 300 according to some embodiments of the present disclosure. As illustrated in FIG. 3, the sensing method 300 includes operations S310, S320, S330, and S340.

In some embodiments, the processor 110 in FIG. 1 can perform operations S310, S320, S330, and S340.

Figure 4B:
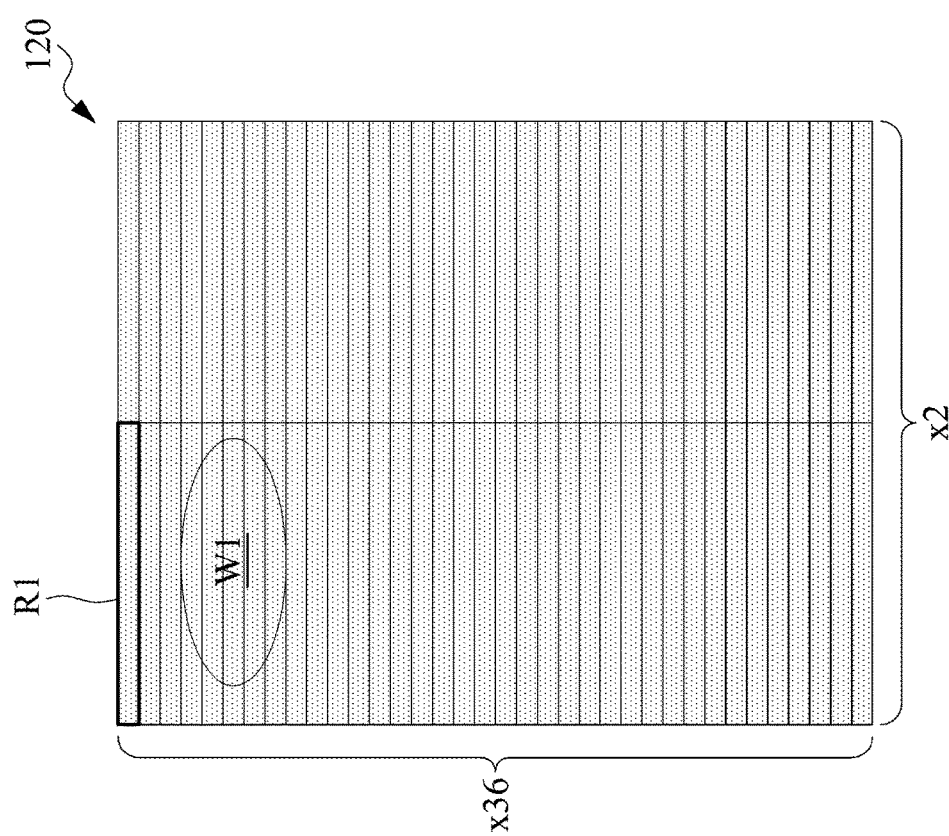
FIG. 4A and FIG. 4B are schematic diagrams illustrating the touch panel in FIG. 2 with water according to some embodiments of the present disclosure.
Figure 4A:
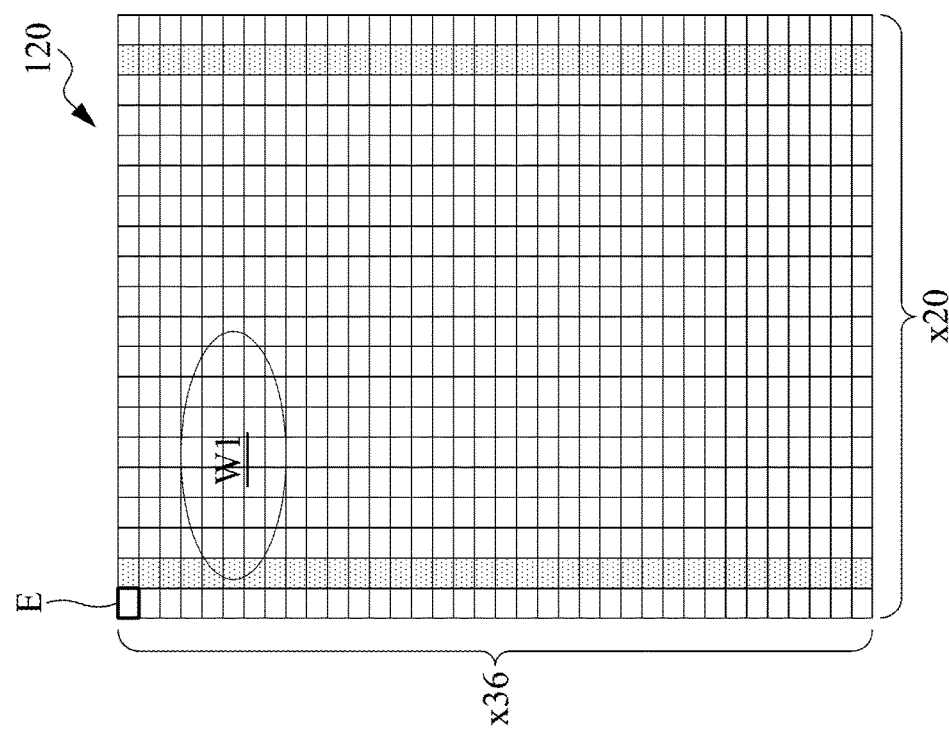

In operation S310, the processor 110 enters a first touch sensing process for the touch panel 120 and performs a non-water mode. Reference is made to FIG. 4A. FIG. 4A is a schematic diagram illustrating the touch panel 120 in FIG. 2 with water W1 according to some embodiments of the present disclosure. As illustrated in FIG. 4A, the sensing electrodes E are driven by turns in the non-water mode. To be more specific, the sensing electrodes E in the leftmost column and the sensing electrodes E in the rightmost column are driven by the driving signal VTX at a first time interval, the sensing electrodes E in the second column from the left and the sensing electrodes E in the second column from the right are driven by the driving signal VTX at a second time interval (as FIG. 4A), and so on. The un-driven sensing electrodes E are coupled to the ground to save power consumption. The processor 110 can perform the first touch sensing process according to the sensing signals VO (shown in FIG. 2) corresponding to these driven sensing electrodes E. In the configuration of FIG. 4A, the sensing signal VO_0 of one driven sensing electrode E can be derived as formula (1) below:

$$VO\_0 = dVTX \times \frac{CS + 2CP}{CF} \quad (1)$$

in which dVTX is an amplitude of the driving signal VTX. In other words, dVTX is equal to a difference between the highest value of the driving signal VTX and the lowest value of the driving signal VTX.

Water W1 affects the capacitor CP. Accordingly, when there is water W1 on one sensing electrode E, the sensing signal VO_0 of this sensing electrode E in formula (1) changes. Thus, the processor 110 can determine that there is an object on this sensing electrode E.

In operation S320, the processor 110 determines whether there is water W1 on the touch panel 120 in the first touch sensing process. Reference is made to FIG. 4B. FIG. 4B is a schematic diagram illustrating the touch panel 120 in FIG. 2 with water W1 according to some embodiments of the present disclosure. As illustrated in FIG. 4B, all of the sensing electrodes E are driven by the driving signal VTX. In addition, the sensing electrodes E are combined in a first direction (e.g., the first direction corresponding to rows). In this example, the sensing electrodes E in one row are combined to be two sensing regions R1 respectively in the left side and the right side in one row, and each of the sensing regions R1 includes ten sensing electrodes E. How to combine the sensing electrodes E as FIG. 4B is described with reference to FIG. 11A. In the configuration of FIG. 4B, the sensing signal VO_1 of one of the sensing regions R1 can be derived as formula (2) below:

$$VO\_1 = dVTX \times \frac{10 \times CS}{CF} \quad (2)$$

As described above, water W1 does not affects the capacitor CS. Accordingly, when there is water W1 on one sensing region R1, the sensing signal VO_1 of this sensing region R1 in formula (2) does not changes. Thus, the processor 110 can further determine that the object is water (e.g., water W1). In other words, the determination of operation S320 is YES (there is water W1 on the touch panel 120) and the touch sensing method 300 enters operation S330. In operation S330, the processor 110 controls the touch panel 120 to enter a second touch sensing process and to performs a water mode.

Figure 5B:
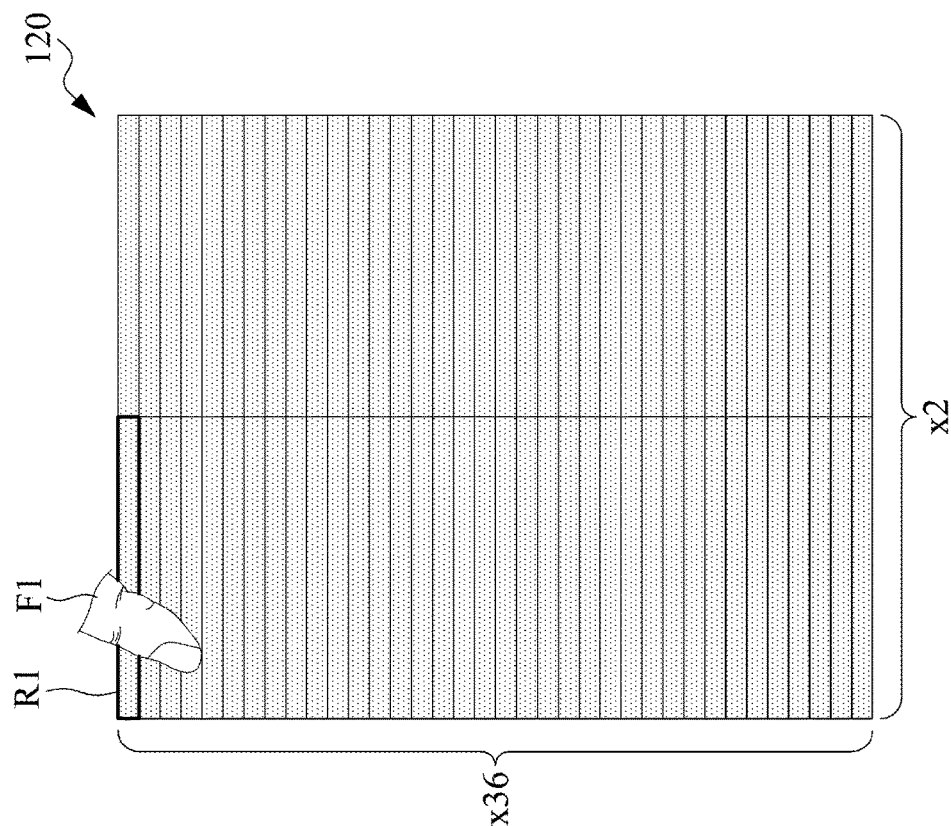
FIG. 5A and FIG. 5B are schematic diagrams illustrating the touch panel in FIG. 2 with a finger according to some embodiments of the present disclosure.
Figure 5A:
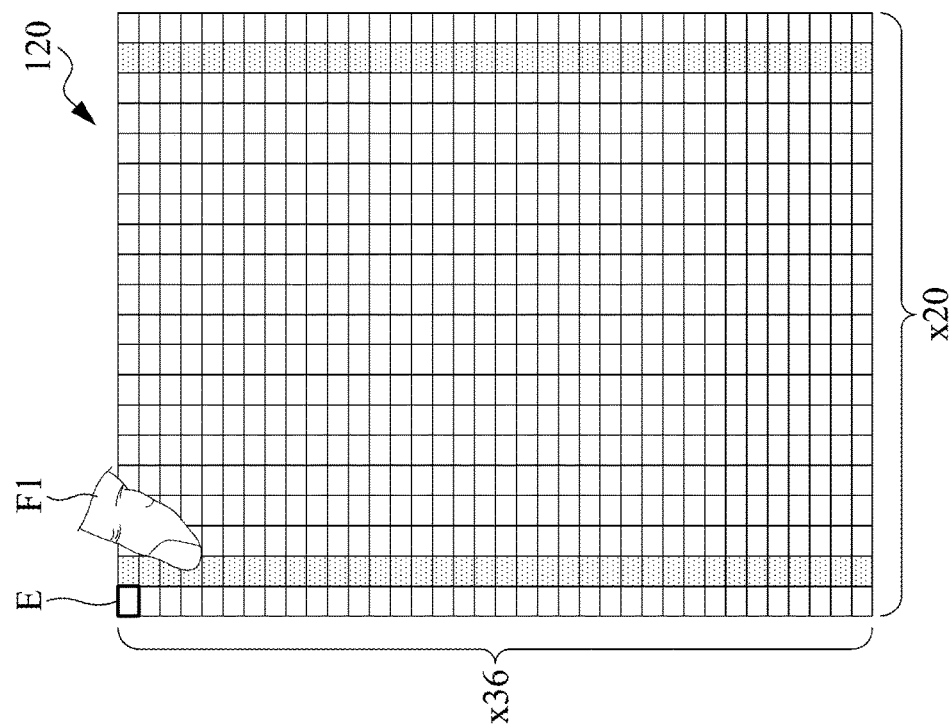

References are made FIG. 5A and FIG. 5B. FIG. 5A and FIG. 5B are schematic diagrams illustrating the touch panel 120 in FIG. 2 with a finger F1 according to some embodiments of the present disclosure.

Compared to FIG. 4A, the finger F1 affects the capacitor CS in FIG. 5A. Accordingly, when there is the finger F1 on one sensing electrode E, the sensing signal VO_0 of this sensing electrode E in formula (1) changes. Thus, the processor 110 can determine that there is an object on this sensing electrode E.

Compared to FIG. 4B, the finger F1 affects the capacitor CS in FIG. 5B. Accordingly, when there is the finger F1 on one sensing region R1, the sensing signal VO_1 of this sensing region R1 in formula (2) changes. Thus, the processor 110 can further determine that the object is a finger (e.g., the finger F1). In other words, the determination of operation S320 is NO. Then, back to operation S310, the processor 110 determines the touch position of the finger F1 and still performs the non-water mode in the first touch sensing process. As illustrated in FIG. 5A, at each time interval, only two columns are driven by the driving signal VTX. Thus, the power consumption can be reduced.

Figure 6B:
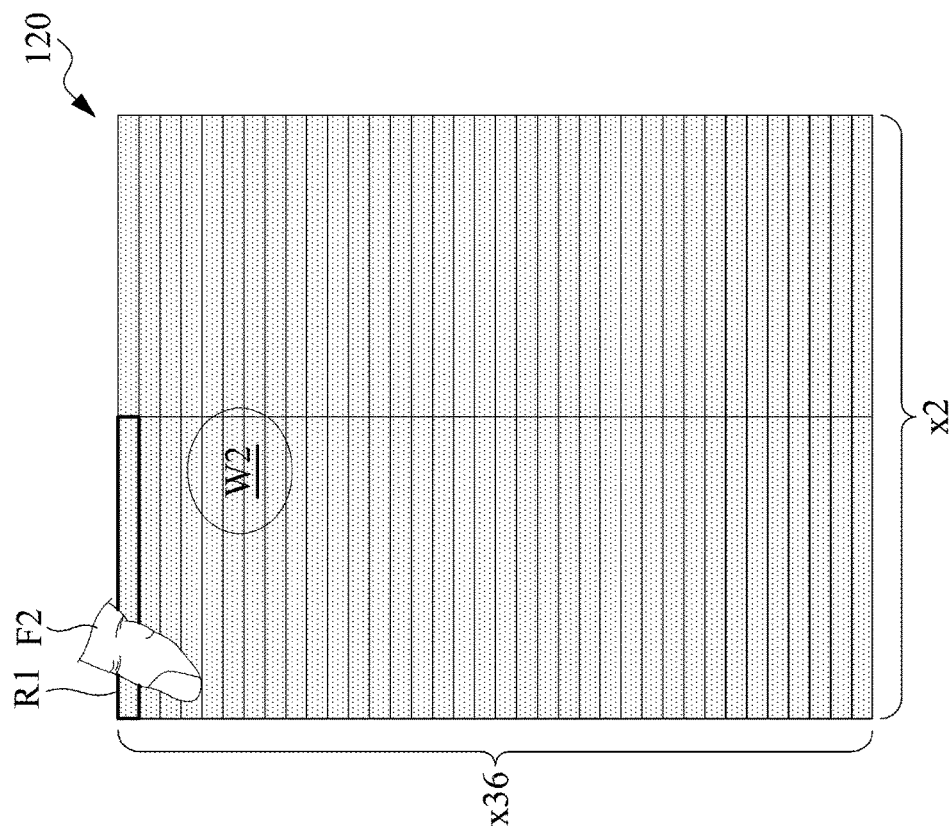
FIG. 6A and FIG. 6B are schematic diagrams illustrating the touch panel in FIG. 2 with water and a finger according to some embodiments of the present disclosure.
Figure 6A:
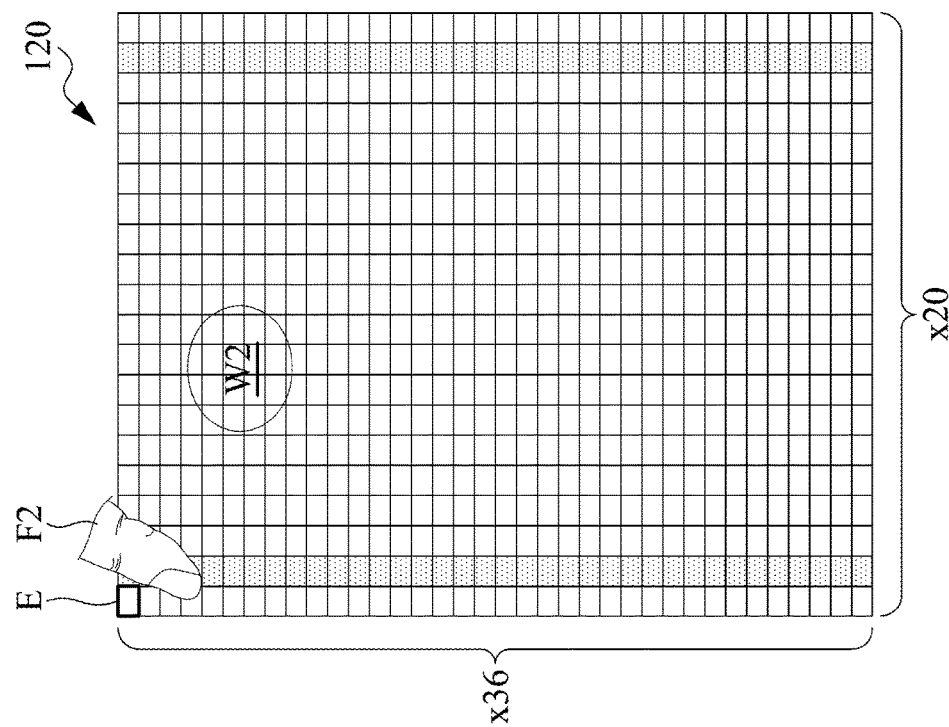

References are made FIG. 6A and FIG. 6B. FIG. 6A and FIG. 6B are schematic diagrams illustrating the touch panel 120 in FIG. 2 with water W2 and a finger F2 according to some embodiments of the present disclosure.

In FIG. 6A, the finger F2 affects the capacitor CS. Accordingly, when there is the finger F2 on one sensing electrode E, the sensing signal VO_0 of this sensing electrode E in formula (1) changes. In addition, water W2 affects the capacitor CP. Accordingly, when there is water W2 on another sensing electrode E, the sensing signal VO_0 of this another sensing electrode E in formula (1) changes. Thus, the processor 110 can determine that there are two objects on the touch panel 120.

In FIG. 6B, the finger F2 affects the capacitor CS. Accordingly, when there are the finger F2 and water W2 on one sensing region R1 (e.g., the finger F2 and water W2 are in the same sensing region R1), the sensing signal VO_1 of this sensing region R1 in formula (2) changes. Thus, the processor 110 can further determine that the two objects at least include at least one finger (e.g., the finger F2).

Figure 6C:
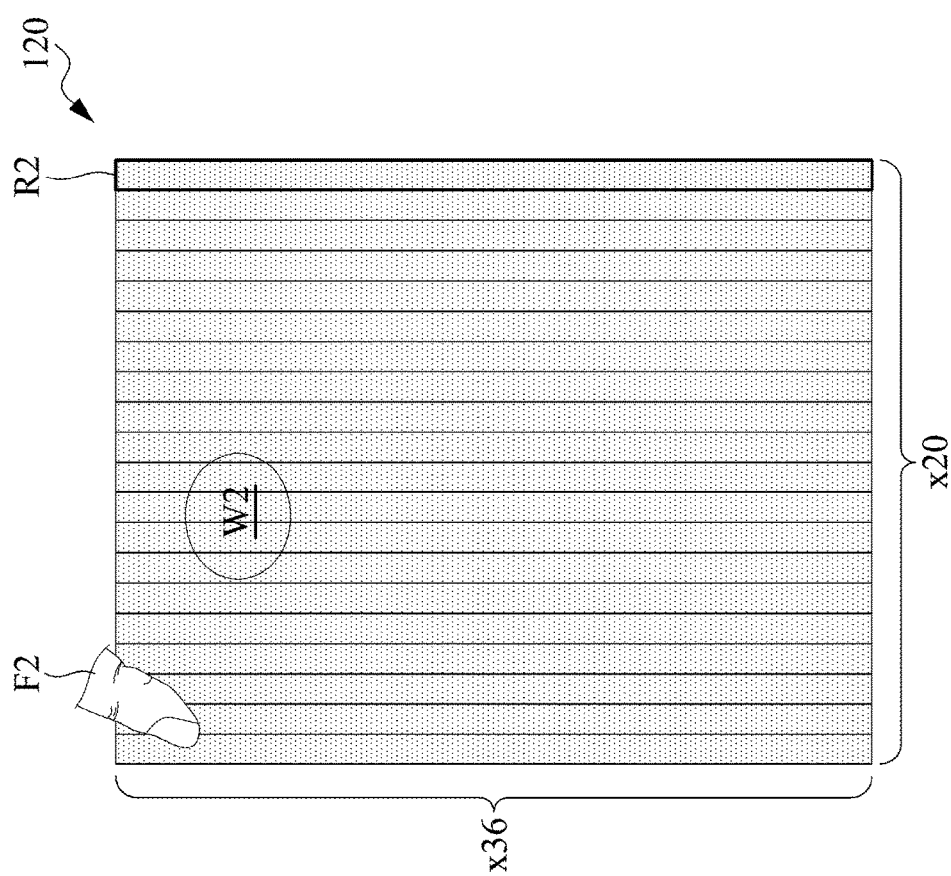
FIG. 6C is a schematic diagram illustrating the touch panel in FIG. 6B with water and the finger according to some embodiments of the present disclosure.

Reference is made to 6C. FIG. 6C is a schematic diagram illustrating the touch panel 120 in FIG. 6B with water W2 and the finger F2 according to some embodiments of the present disclosure.

As illustrated in FIG. 6O, all of the sensing electrodes E are driven by the driving signal VTX. In addition, the sensing electrodes E are combined in a second direction (e.g., the second direction corresponding to columns). In this example, the sensing electrodes E in one column are combined to be one sensing regions R2, and each of the sensing regions R2 includes 36 sensing electrodes E. How to combine the sensing electrodes E as FIG. 6C is described with reference to FIG. 12A. In the configuration of FIG. 6C, the sensing signal VO_2 of one of the sensing regions R2 can be derived as formula (3) below:

$$VO\_2 = dVTX \times \frac{36 \times CS}{CF} \qquad (3)$$

In FIG. 6C, the finger F2 affects the capacitor CS and the water does not affect the capacitor CS. Accordingly, when there are the finger F2 and water W2 on different sensing regions R2, the sensing signal VO_2 of the sensing region R2 corresponding to the finger F2 in formula (3) changes and the sensing signal VO_2 of the sensing region R2 corresponding to water W2 in formula (3) does not change. Thus, the processor 110 can further determine which object is a finger (e.g., the finger F2) and which object is water (e.g., water W2) according to the sensing signals VO_2. The processor 110 can determine the touch position of the finger F2 according to the changed sensing signal VO_2. In addition, since the determination of operation S320 is YES (there is water W2 on the touch panel 120) according to the unchanged sensing signal VO_2, the touch sensing method 300 enters operation S330.

Figure 7A:
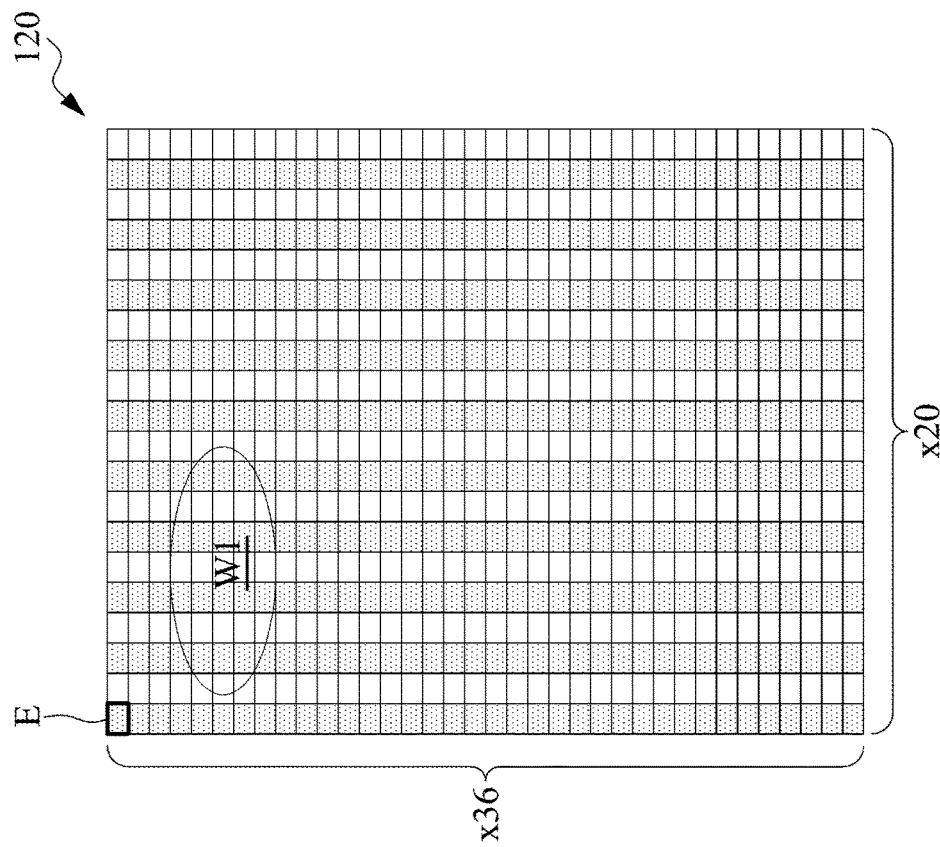
FIG. 7A and FIG. 7B are schematic diagrams illustrating the touch panel in FIG. 4A with water according to some embodiments of the present disclosure.

In operation S330, the processor 110 enters the second touch sensing process and performs the water mode. Reference is made to FIG. 7A. FIG. 7A is a schematic diagram illustrating the touch panel 120 in FIG. 4A with water W1 according to some embodiments of the present disclosure. As illustrated in FIG. 7A, all of the sensing electrodes E are driven synchronously in the water mode. To be more specific, all of the sensing electrodes E are driven at the same time interval. In this example, in addition to two driven columns driven by the driving signal VTX from the sensing circuits S1 and S2 in FIG. 2, other sensing electrodes E are driven by a driving signal VTX from at least one driver circuit D2 (e.g., operational amplifier). The driving signal VTX from the driver circuit D2 is called as Load Free Driving (LFD) signal. The processor 110 can perform the second touch sensing process according to the sensing signals VO (shown in FIG. 2) corresponding to these driven sensing electrodes E. In the configuration of FIG. 7A, the sensing signal VO_0 of one driven sensing electrode E can be derived as formula (4) below:

$$VO\_0 = dVTX \times \frac{CS}{CF} \qquad (4)$$

Water W1 does not affect the capacitor CS. Accordingly, when there is water W1 on one sensing electrode E, the sensing signal VO_0 of this sensing electrode E in formula (4) does not changes. Thus, the processor 110 does not sense the object (e.g., water W1). Without sensing the object, the processor 110 certainly does not determine the touch position of the object (e.g., water W1).

Figure 7B:
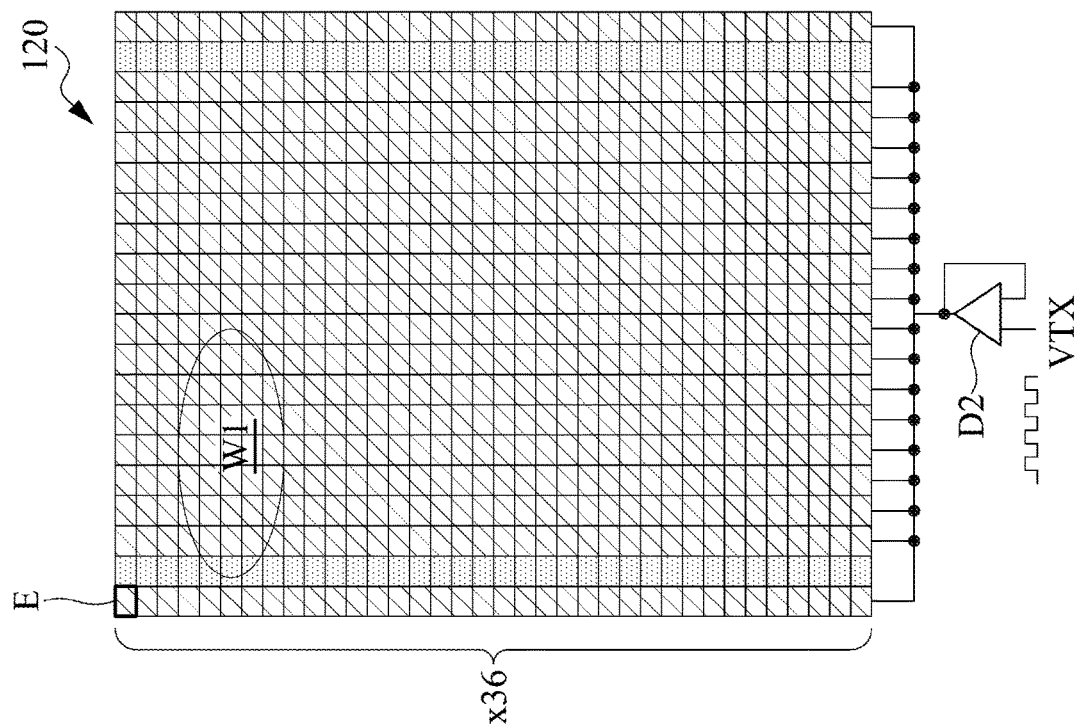

In operation S340, the processor 110 determines whether there is water W1 on the touch panel 120 in the second touch sensing process. Reference is made to FIG. 7B. FIG. 7B is a schematic diagram illustrating the touch panel 120 in FIG. 4A with water W1 according to some embodiments of the present disclosure. As illustrated in FIG. 7B, a first group of the sensing electrodes E are driven by the driving signal VTX, and a second group of the sensing electrodes E are not driven, in which the second group of the sensing electrodes E are adjacent to the first group of the sensing electrodes E. In this example, the sensing electrodes E in the leftmost column are driven by the driving signal VTX, the sensing electrodes E in the second column from the left are not driven, and so on. Effectively, the un-driven column is adjacent to the driven column. In the configuration of FIG. 7B, the sensing signal VO_3 of one of the driven sensing electrodes E can be derived as formula (5) below:

$$VO\_3 = dVTX \times \frac{CS + 2CP}{CF} \qquad (5)$$

Water W1 affects the capacitor CP. Accordingly, when there is water W1 on one of the driven sensing electrodes E, the sensing signal VO_3 of this driven sensing electrode E in formula (5) changes. Thus, the processor 110 can further determine that there is water (e.g., water W1) on the touch panel 120. In other words, the determination of operation S340 is YES (there is water W1 on the touch panel 120) and the touch sensing method 300 enters operation S330. In operation S330, the processor 110 controls the touch panel 120 to continue to perform the water mode in the second touch sensing process.

On the contrary, when water W1 is removed, the sensing signals VO_3 of the driven sensing electrodes E in formula (5) do not changes. Thus, the processor 110 can further determine that there is no water on the touch panel 120. In other words, the determination of operation S340 is NO (there is no water W1 on the touch panel 120) and the touch sensing method 300 enters operation S310. In operation S310, the processor 110 enters the first touch sensing process and performs the non-water mode.

As illustrated in FIGS. 4A, 5A, and 6A, at each time interval, only two columns are driven by the driving signal VTX in the non-water mode. As illustrated in FIG. 7A, all sensing electrodes E are driven by the driving signal VTX in the water mode. Thus, the power consumption of the non-water mode is less than the power consumption of the water mode.

Figure 8:
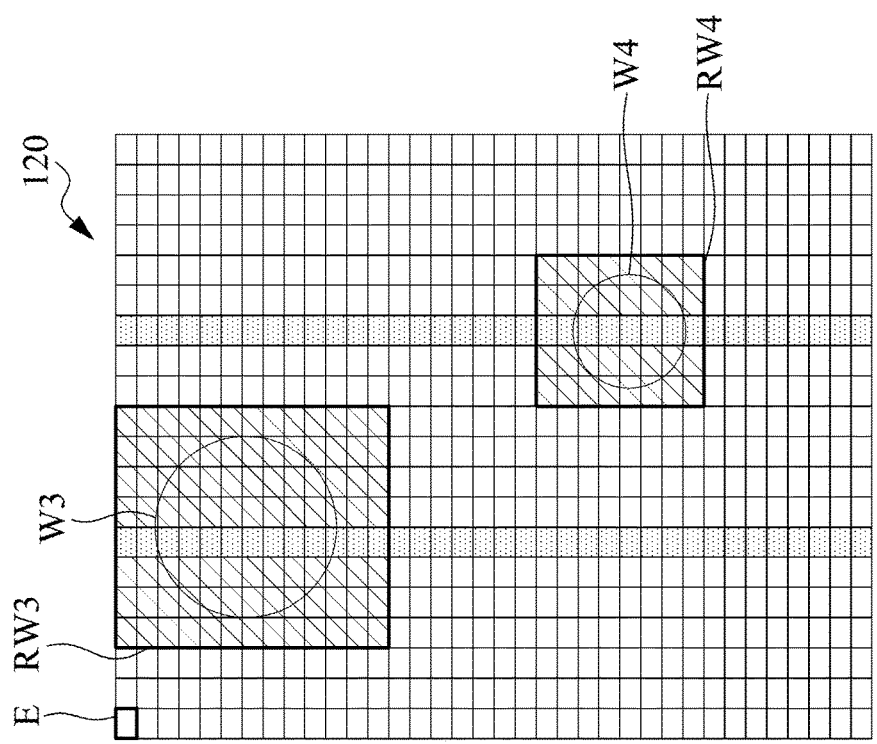
FIG. 8 is a schematic diagram illustrating the touch panel in FIG. 2 with water according to some embodiments of the present disclosure.

As described above, in FIG. 6C, the processor 110 can determine which object is water W2. In other words, the processor 110 can determine the position of the water W2. Accordingly, in some embodiments, the processor 110 can control that some target sensing electrodes E in a range corresponding to the position of water W2 are driven and other sensing electrodes E are not driven in order to save power. Reference is made to FIG. 8. FIG. 8 is a schematic diagram illustrating the touch panel 120 in FIG. 2 with water W3 and water W4 according to some embodiments of the present disclosure. As illustrated in FIG. 8, in addition to two driven columns driven by the driving signal VTX from the sensing circuits S1 and S2 in FIG. 2, the processor 110 can control other target sensing electrodes E in ranges RW3-RW4 corresponding to positions of water W3-W4 (e.g., ranges RW3-RW4 under the water W3-W4) are driven by the driving signal VTX (LFD signal) from the at least one driver circuit D2 in FIG. 7A.

As described above, the power consumption of the non-water mode (FIGS. 4A, 5A, and 6A) is less than the power consumption (FIG. 7A) of the water mode. In addition, the power consumption of the water mode in FIG. 8 is less than the power consumption of the water mode in FIG. 7A.

In addition, the sensing signal VO_1 and the sensing signal VO_2 above are for determining that the object is water or a finger. These determinations do not require very high SNR. In other words, the bias current in the sensing circuit S2, sensing time, and the amplitude of the driving signal can be reduced for these determinations. Thus, the power consumption can be further reduced.

Figure 9:
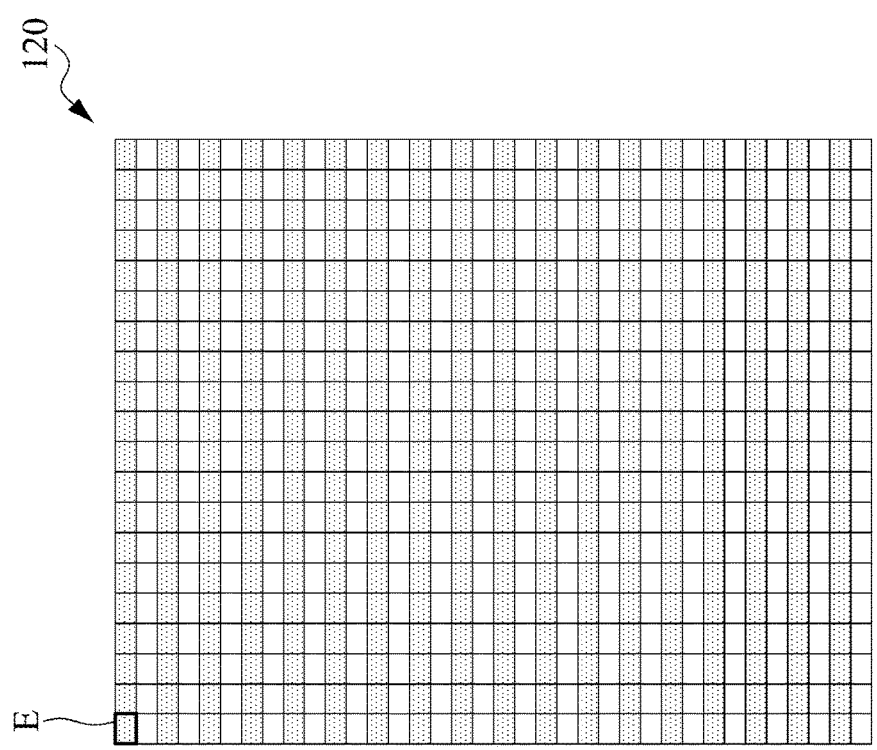
FIG. 9 is a schematic diagram illustrating another embodiment associated with FIG. 7B.

Reference is made to FIG. 9. FIG. 9 is a schematic diagram illustrating another embodiment associated with FIG. 7B. In some embodiments, a first group of the sensing electrodes E are driven by the driving signal VTX, and a second group of the sensing electrodes E are not driven, in which the second group of the sensing electrodes E are adjacent to the first group of the sensing electrodes E. In this example, the sensing electrodes E in the upmost row are driven by the driving signal VTX, the sensing electrodes E in the second row from the up are not driven, and so on. Effectively, the un-driven row is adjacent to the driven row. In the configuration of FIG. 9, the sensing signal VO_3 of one sensing electrode E can be derived as formula (5) above.

Figure 10:
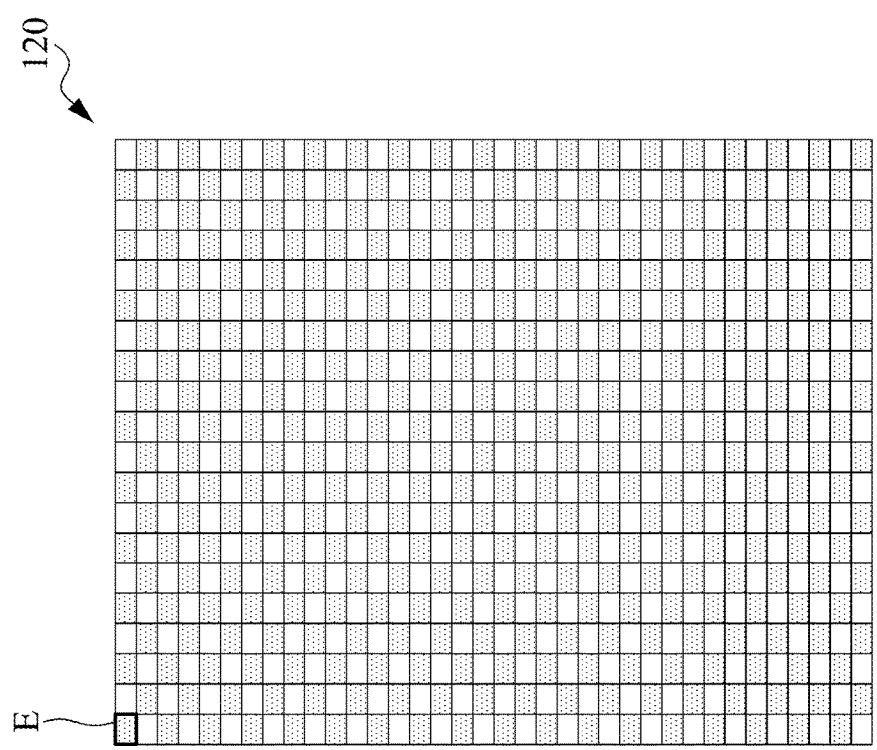
FIG. 10 is a schematic diagram illustrating another embodiment associated with FIG. 7B.

Reference is made to FIG. 10. FIG. 10 is a schematic diagram illustrating another embodiment associated with FIG. 7B. In some embodiments, a first group of the sensing electrodes E are driven by the driving signal VTX, and a second group of the sensing electrodes E are not driven, in which the second group of the sensing electrodes E are adjacent to the first group of the sensing electrodes E. In this example, the first group of the sensing electrodes E and the second group of the sensing electrodes E are staggered. To be more specific, four un-driven sensing electrodes E are adjacent to one driven sensing electrode E. In the configuration of FIG. 10, the sensing signal VO_3 of the sensing electrode E can be derived as formula (6) above:

$$VO\_3 = dVTX \times \frac{CS + 4CP}{CF} \quad (6)$$

Figure 11A:
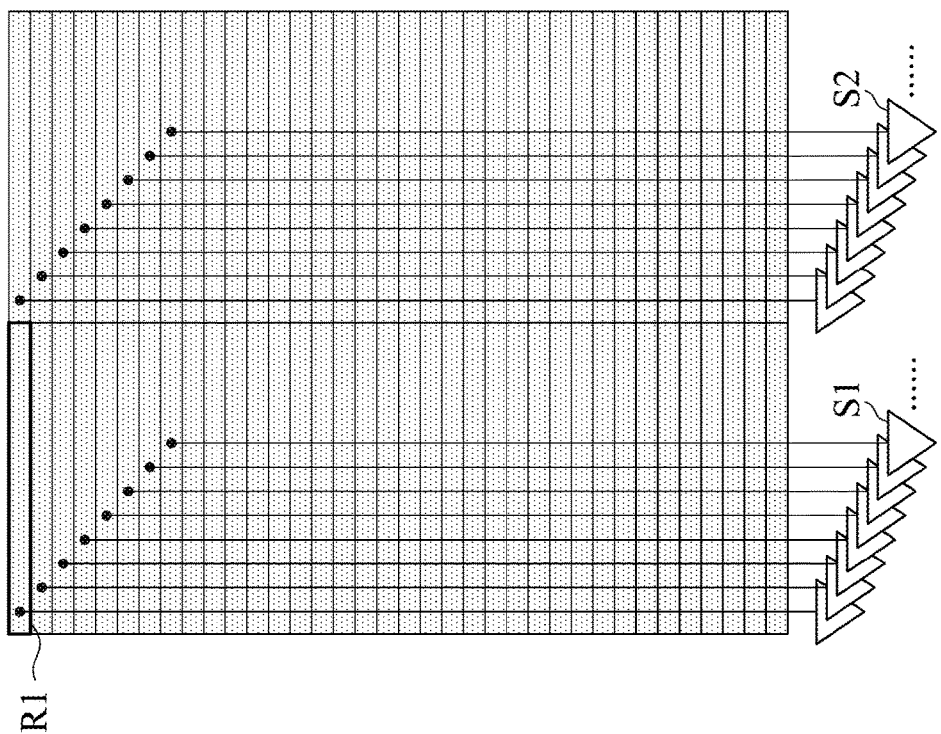
FIG. 11A and FIG. 11B are schematic diagrams illustrating combining the sensing electrodes in a first direction according to some embodiments of the present disclosure.
Figure 11B:
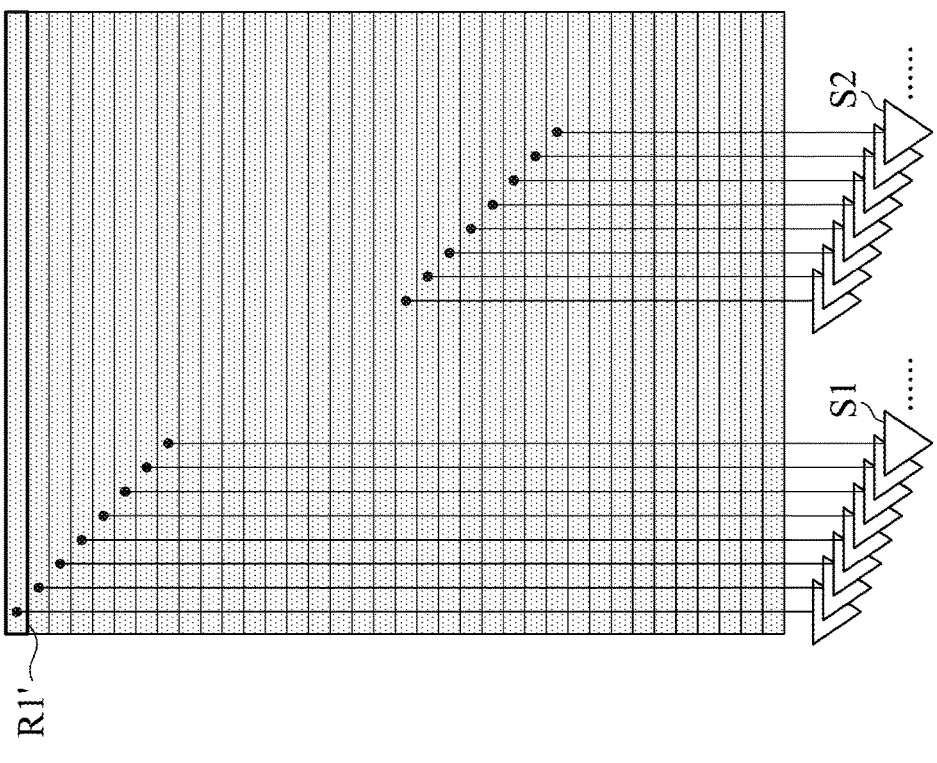

FIG. 11A and FIG. 11B are schematic diagrams illustrating combining the sensing electrodes in a first direction according to some embodiments of the present disclosure.

As illustrated in FIG. 11A and FIG. 2, the multiplexer M1 selects the sensing electrodes E in one sensing range R1 at the left side and couples the sensing electrodes E in the sensing range R1 to one sensing circuit S1. Similarly, the multiplexer M2 selects the sensing electrodes E in one sensing range R1 at the right side and couples the sensing electrodes E in the sensing range R1 to one sensing circuit S2. Other sensing regions have similar structure, so they are not described herein again. Thus, all of the sensing electrodes are combined in the first direction (e.g., the first direction corresponding to rows), and the sensing electrodes E in the same row are combined into two sensing regions R1.

As illustrated in FIG. 11B and FIG. 2, one of the major differences between FIG. 11B and FIG. 11A is that, in FIG. 11B, the sensing electrodes E in the same row are combined into one sensing region R1'. The multiplexer M1 selects the sensing electrodes E in one sensing range R1' at the upper side and couples the sensing electrodes E in the sensing range R1' to one sensing circuit S1. Similarly, the multiplexer M2 selects the sensing electrodes E in one sensing range R1' at the lower side and couples the sensing electrodes E in the sensing range R1' to one sensing circuit S2.

Figure 12A:
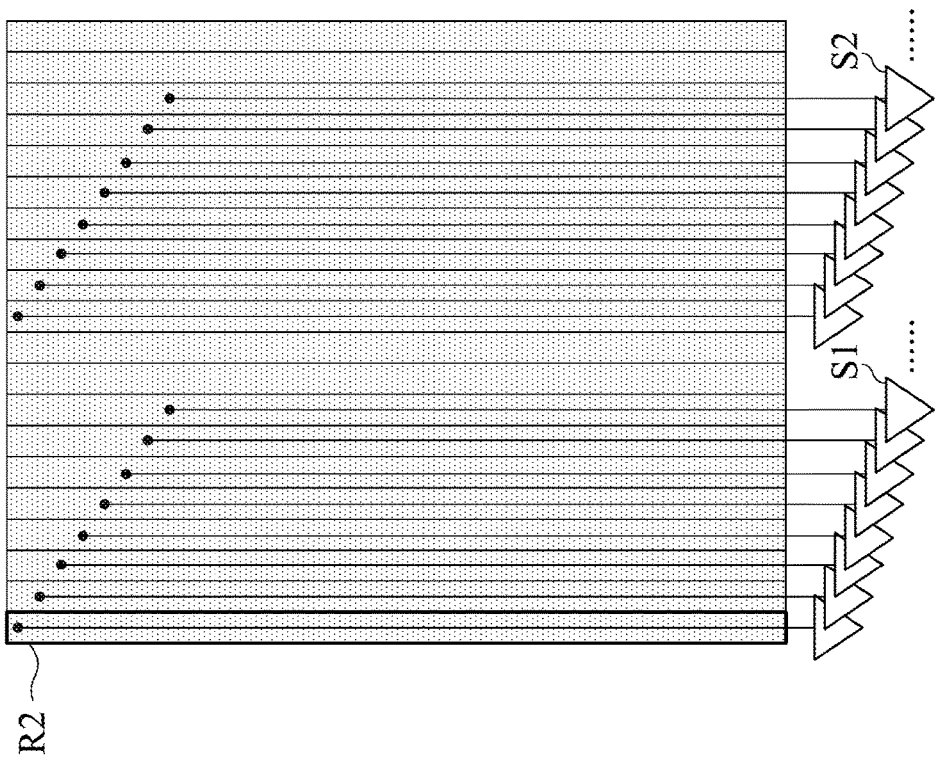
FIG. 12A and FIG. 12B are schematic diagrams illustrating combining the sensing electrodes in a second direction according to some embodiments of the present disclosure.
Figure 12B:
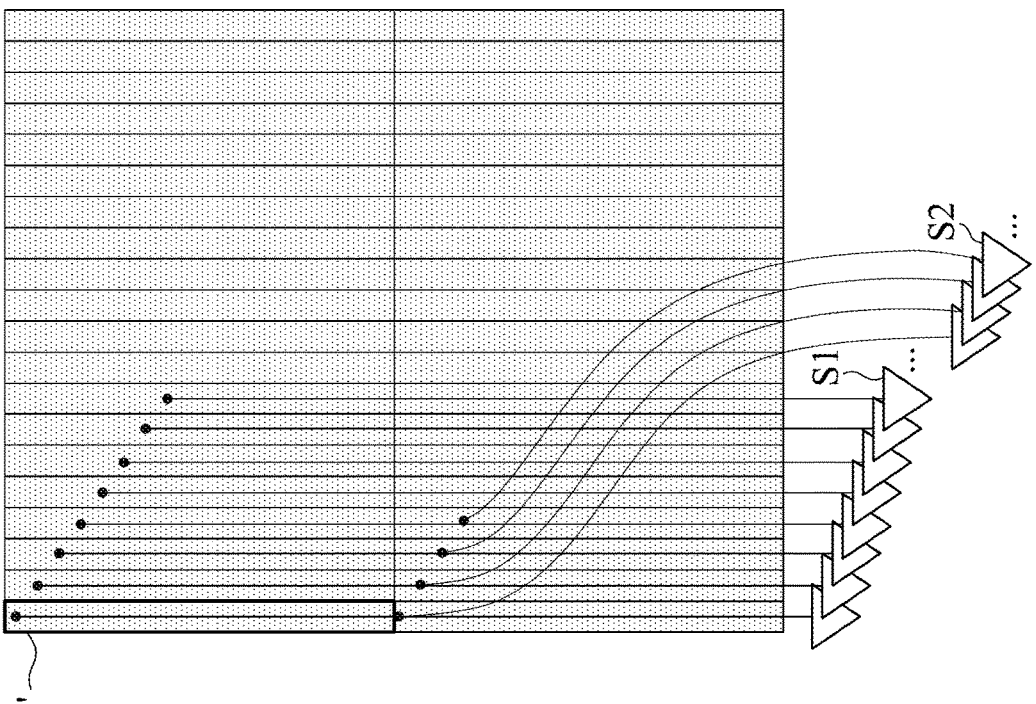

FIG. 12A and FIG. 12B are schematic diagrams illustrating combining the sensing electrodes in a second direction according to some embodiments of the present disclosure.

As illustrated in FIG. 12A and FIG. 2, the multiplexer M1 selects the sensing electrodes E in one sensing range R2 at the left side and couples the sensing electrodes E in the sensing range R2 to one sensing circuit S1. Similarly, the multiplexer M2 selects the sensing electrodes E in one sensing range R2 at the right side and couples the sensing electrodes E in the sensing range R2 to one sensing circuit S2. Other sensing regions have similar structure, so they are not described herein again. Thus, all of the sensing electrodes are combined in the second direction (e.g., the second direction corresponding to columns), and the sensing electrodes E in the same column are combined into one sensing region R2.

As illustrated in FIG. 12B and FIG. 2, one of the major differences between FIG. 12B and FIG. 12A is that, in FIG. 12B, the sensing electrodes E in the same column are combined into two sensing regions R2'. The multiplexer M1 selects the sensing electrodes E in one sensing range R2' at the upper side and couples the sensing electrodes E in the sensing range R2' to one sensing circuit S1. Similarly, the multiplexer M2 selects the sensing electrodes E in one sensing range R2' at the lower side and couples the sensing electrodes E in the sensing range R2' to one sensing circuit S2.

It is noted that the multiplexers M1-M2 in FIG. 2 are omitted in FIG. 11A, FIG. 11B, FIG. 12A, and FIG. 12B for better understanding.

Based on the descriptions above, in the present disclosure, the power consumption of the touch panel can be saved.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch sensing method for a touch panel having a plurality of sensing electrodes, the touch sensing method comprising:

(A) entering a first touch sensing process, wherein the first touch sensing processing comprises:

(a1) performing a non-water mode; and (a2) determining whether there is water on the touch panel, comprising:

(i) combining the plurality of sensing electrodes in a first direction to form a plurality of first sensing regions, wherein the plurality of sensing electrodes are driven by a first driving signal;

(ii) sensing, by a plurality of sensing circuits, the plurality of first sensing regions to output a plurality of first combined sensing signals representing sensing results of the plurality of first sensing regions, respectively; and (iii) determining that water is on the touch panel when the plurality of first combined sensing signals does not change; and (B) entering a second touch sensing process when determining that the water is on the touch panel in the first touch sensing process, wherein the second touch sensing process comprises:

(b1) performing a water mode, wherein at least part of the plurality of sensing electrodes are driven synchronously in the water mode; and (b2) entering the first touch sensing process to perform the non-water mode when determining that the water has been removed from the touch panel.

2. The touch sensing method of claim 1, wherein in the non-water mode, the plurality of sensing electrodes are driven by turns.

3. The touch sensing method of claim 2, wherein in the water mode, all of the plurality of sensing electrodes are driven synchronously.

4. The touch sensing method of claim 3, wherein the plurality of first combined sensing signals are associated with a first type capacitance.

5. The touch sensing method of claim 4, wherein (a2) determining whether there is water on the touch panel further comprises:
  (iv) combining the plurality of sensing electrodes in a second direction to form a plurality of second sensing regions, wherein the plurality of sensing electrodes are driven by a second driving signal;
  (v) sensing, by the plurality of sensing circuits, the plurality of second sensing regions to output a plurality of second combined sensing signals representing sensing results of the plurality of second sensing regions, respectively, wherein the plurality of second combined sensing signals are associated with the first type capacitance;
  (vi) determining the water is on the touch panel when the plurality of second combined sensing signals does not change; and
  (vii) determining a touch position when the plurality of second combined sensing signals change.

6. The touch sensing method of claim 5, wherein (b2) entering the first touch sensing process to perform the non-water mode when determining that the water has been removed from the touch panel comprises:
  in the second touch sensing process, determining whether a third sensing signal associated with the first type capacitance and a second type capacitance changes in a situation that a first group of the plurality of sensing electrodes is driven and a second group of the plurality of sensing electrodes is not driven.

7. The touch sensing method of claim 6, wherein the first group of the plurality of sensing electrodes is in a first column, the second group of the plurality of sensing electrodes is in a second column, and the second column is adjacent to the first column.

8. The touch sensing method of claim 6, wherein the first group of the plurality of sensing electrodes is in a first row, the second group of the plurality of sensing electrodes is in a second row, and the second row is adjacent to the first row.

9. The touch sensing method of claim 6, wherein the first group of the plurality of sensing electrodes and the second group of the plurality of sensing electrodes are staggered.

10. The touch sensing method of claim 6, wherein the first type capacitance is self capacitance, and the second type capacitance is mutual capacitance.

11. The touch sensing method of claim 2, wherein in the water mode, a plurality of target sensing electrodes of the plurality of sensing electrodes are driven synchronously, wherein the target sensing electrodes are in a range, and the range is corresponding to a position of water.

12. The touch sensing method of claim 1, wherein the touch panel is a touch and organic light-emitting diode display panel.

13. The touch sensing method of claim 1, wherein (a1) performing the non-water mode comprises:
  before (a2) determining whether there is water on the touch panel, determining that an object is on the touch panel when a sensing signal of one of the plurality of sensing electrodes changes.

* * * * *